United States Patent [19]

Houlihan et al.

[11] 3,880,885

[45] Apr. 29, 1975

[54] TERTIARY AMINOETHYL ISOCHROMANS AND ISOCOUMARINS

[75] Inventors: William J. Houlihan, Baden, Austria; Jeffrey Nadelson, Lake Parisippany, N.J.

[73] Assignee: Sandoz-Wander, Inc., Hanover, N.J.

[22] Filed: Mar. 7, 1972

[21] Appl. No.: 232,614

Related U.S. Application Data

[63] Continuation-in-part of Ser. No. 201,558, Nov. 23, 1971, abandoned, which is a continuation-in-part of Ser. No. 57,315, July 22, 1970, abandoned.

[52] U.S. Cl. 260/343.2 R; 260/239 B; 260/239 BF; 260/243 B; 260/247.2 A; 260/247.2 B; 260/247.7 G; 260/268 R; 260/268 BC; 260/293.58; 260/326.3; 260/326.5 CA; 260/345.2; 260/559 A; 424/279; 424/283

[51] Int. Cl. ............................................. C07d 7/24

[58] Field of Search....... 260/239 B, 239 BF, 243 B, 260/247.2 B, 247.7 G, 268 BC, 293.58, 326.3, 326.5 CA, 343.2 R, 345.2

[56] References Cited
UNITED STATES PATENTS 3,467,675   9/1969   Petersen et al. ................. 260/346.2

*Primary Examiner*—G. Thomas Todd
*Attorney, Agent, or Firm*—Gerald D. Sharkin; Robert S. Honor; Walter F. Jewell

[57] ABSTRACT

Isochromans and isocoumarins substituted at the 3-position with a tertiary aminoethyl moiety, e.g., 3-[2-(dimethylamino)ethyl]-3,4-dihydro-3-phenyl isocoumarin, are prepared by cyclizing corresponding 2-substituted benzamides. The compounds are useful as diuretic and antihypertensive agents.

5 Claims, No Drawings

TERTIARY AMINOETHYL ISOCHROMANS AND ISOCOUMARINS

This application is a continuation-in-part of application, Ser. No. 201,558, filed Nov. 23, 1971, which in turn is a continuation in-part of application Ser. No. 57,315, filed July 22, 1970, both now abandoned.

This invention relates to tertiary aminoethyl isochromans and isocoumarins. More particularly, it relates to 3,4-dihydro isochromans and isocoumarins substituted at the 3-position with a tertiary aminoethyl moiety and a phenyl or substituted phenyl group. The invention also relates to intermediates for said isochromans and isocoumarins, to acid addition salts thereof, and to processes for their preparation.

The compounds of this invention may be represented by the following structural formula:

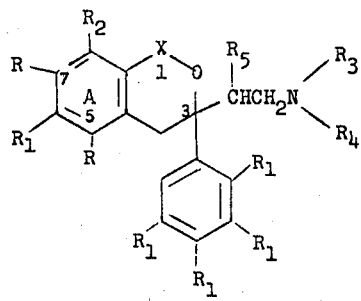

(I)

wherein
each $R_1$, independently, represents hydrogen, halo having an atomic weight of 19 to 36, trifluoromethyl, loweralkoxy, i.e., alkoxy having 1 to 5 carbon atoms, e.g., methoxy, ethoxy, propoxy, isopropoxy, butoxy, and the like, or loweralkyl, i.e., alkyl having 1 to 5 carbon atoms, e.g., methyl, ethyl, isopropyl and the like; or two of $R_1$, taken together, represent methylenedioxy, provided they are on adjacent carbon atoms;

each R, independently, represents hydrogen, trifluoromethyl, loweralkyl, as previously defined, or loweralkoxy, as previously defined;

$R_2$ represents hydrogen, trifluoromethyl, loweralkoxy, as previously defined, or halo having an atomic weight of 19 to 36;

$R_3$ and $R_4$, independently, represent loweralkyl as previously defined, loweralkenyl, i.e., alkenyl having 2 to 5 carbon atoms such as allyl, methallyl and the like, or benzyl, or $R_3$ and $R_4$, together, represent $-(CH_2)_n-$ where $n$ is 4,5,6, or 7, or $R_3$ and $R_4$, together, represent

where
Z represents O, S, or $N-R_6$,
$R_5$ represents hydrogen or straight chain alkyl of 1-5 carbon atoms
$R_6$ represents loweralkyl, as earlier defined; and
X represents $$-CH_2-, \text{ or } -\overset{\overset{\text{O}}{\|}}{C}-$$

provided that no more than three of R, $R_1$ and $R_2$ are other than hydrogen, and more than two of R, $R_1$ and $R_2$ are other than hydrogen on any one ring, provided further that both $R_1$ and $R_2$ on ring A cannot be halo, provided also that two trifluoromethyl groups are not on adjacent carbon atoms.

The process for preparing the compounds of formula (1) where X is $$-\overset{\overset{\text{O}}{\|}}{C}-\text{(Ia)}$$

may be represented by the following reaction scheme.

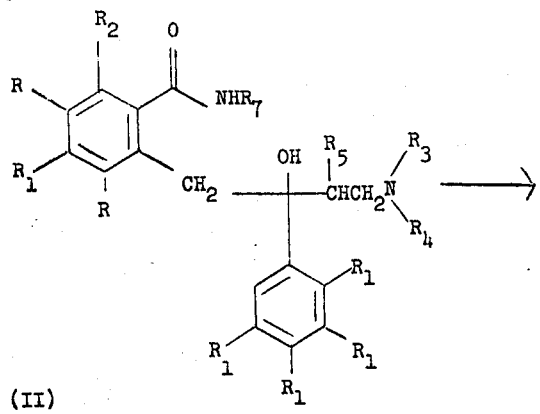

wherein
R, $R_1, R_2, R_3, R_4, R_5$ and the provisos are as indicated above, and
$R_7$ represents loweralkyl, as previously defined, loweralkenyl, as previously defined, or benzyl.

The compounds of formula (Ia) aare prepared by heating a compound of formula (II) optionally in inert solvent such as ethers, e.g., ethyl ether or tetrahydrofuran, hydrocarbons or halogenated hydrocarbons such as hexane, heptane, benzene, toluene, o-dichlorobenzene and the like, at about 100°–220°C. preferably about 140°–160°C. for about 15 to 48 hours, preferably about 20 to 28 hours. The temperatures and times used are not critical. To improve yields and obtain a better quality product, the reaction may be performed under inert atmosphere, e.g., nitrogen gas.

The compounds of formula (I) where X is $-CH_2-$ (Ib) may be prepared by first treating a corresponding compound of formula (Ia) or an acid addition salt thereof with borontrifluoride etherate and a reducing agent such as sodium borohydride or lithium borohydride, in an inert solvent such as tetrahydrofuran, diethyleneglycoldimethylether (diglyme), and the like, at a temperature of from 0° to 80°C, preferably 50° to 60°C, for about 0.5 to 2 hours, preferably about 1 hour. The resulting borohydride adduct is subsequently treated with acid such as concentrated hydrochloric acid, concentrated sulfuric acid, glacial acetic acid and the like, preferably glacial acetic acid, at a temperature of from 40° to the reflux temperature of the solvent, preferably at the solvent reflux temperature for about 1 to 8 hours, preferably 4 to 6 hours. The reaction may be carried out in an inert solvent such as tetrahydrofuran ether and the like, although solvent is not essential. Neither the solvents nor temperatures used are critical.

The compounds of formulas (Ia) and (Ib) may be prepared in acid addition salt form, such as the hydrochloride, by conventional methods, such as suspending the compound in alcohol or water and treating with the appropriate acid. When it is desired to convert such salts to the corresponding free bases, conventional techniques may be utilized, e.g., dissolution of the salt in water and precipitation using a base such as sodium hydroxide.

The compounds of formulas (Ia) and (Ib) may be recovered using conventional recovery techiques such as crystallization.

The compounds of formula (II) may be prepared as indicated by the following reaction scheme:

It will be understood that certain of the compounds of formulas (Ia), (Ib) and (II) exist in racemic form or in the form of optically active isomers. Additionally, certain of the compounds of formula (Ia) and (Ib), particularly those compounds (Ia) and (Ib) where $R_5$ represents a loweralkyl moiety, may also exist as diastereomeric isomers. The separation and recovery of the respective isomers may be accomplished employing conventional techniques and such isomers are included within the scope of this invention.

The compounds of formulas (Ia) and (Ib) are useful because they possess pharmacological activity in animals. In particular, the compounds can be used as diurectic agents as indicated by their activity in the unanesthetized rat when tested basically as described by R. Aston, Toxicol. and Appl. Pharmacol. 1 277, (1959).

Additionally, the compounds (Ia) and (Ib) are useful as antihypertensive agents as indicated by their activity in hypertensive rat tested using a method basically as described by A. Grollman (Proc. Soc. Exptl. Biol. and Med. 57: 103, 1944).

When so utilized, the compounds may be combined with one or more pharmaceutically acceptable carriers or adjuvants. They may be administered orally or parenterally, and, depending upon the compound em-

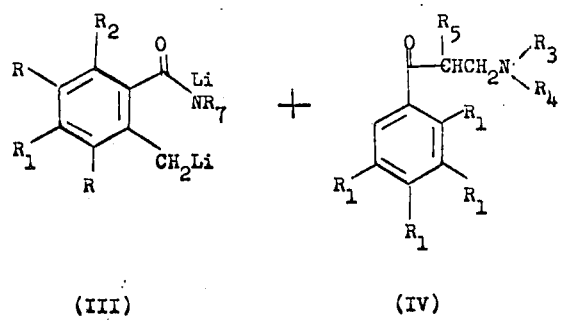

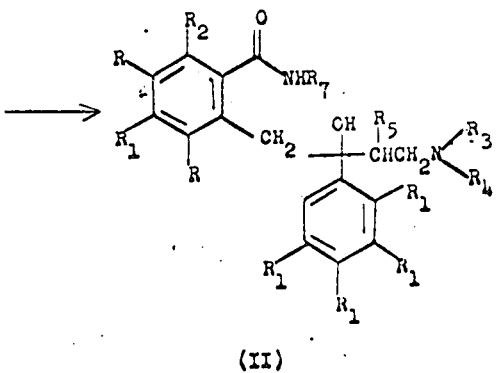

wherein R, $R_1$, $R_2$, $R_3$, $R_4$, $R_5$, $R_7$ and the provisos are as indicated above.

The compounds of formula (II) are prepared by condensing a compound of formula (III) with a compound of formula (IV) in the presence of inert atmosphere, e.g., nitrogen gas, in an inert solvent such as diethyl ether, tetrahydrofuran, hexane, heptane, benzene and the like or mixtures thereof, and subjecting the reaction mixture to hydrolysis, preferably with aqueous ammonium chloride. The condensation may be carrier out at a temperature of from about −80° to −20°C., preferably −60° to −40°C. for about 1 to 3 hours. The hydrolysis is performed in conventional manner at a temperature of about −20° to 0°C. Neither temperatures solvents nor hydrolyzing agent are critical. Compound (IV) is preferably added in inert solvent to a cold (−60° to −40°C.) inert solvent solution of compound (III). Conventional tenchiques may be used to recover the product (II).

Certain of the compounds of formula (III) and (IV) are known and may be prepared my methods disclosed in the literature. Those compounds (III) and (IV) not specifically disclosed may be prepared by analogous methods from known materials.

ployed and the mode of administration, the exact dosage utilized may vary.

Furthermore, the compounds of formulas (Ia) and (Ib) may be similarly administered in the form of their non-toxic pharmaceutically acceptable acid addition salts. Such salts possess the same order of activity as the free base, are readily prepared by reacting the base with an appropriate acid (and vice versa) and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzenesulfonate and the like.

As noted above, the compounds of formulas (Ia) and (Ib) exist as diastereomeric or optical isomers. In some cases greater pharmacological activity or other beneficial attribute may be found for a particular isomer and in such instances administration of such isomer may be preferred.

In general, satisfactory results are obtained when the compounds are administered for the diuretic or antihypertensive uses at a daily dosage of from about 1 − 200 mg/kg of animal body weight, preferably given in divided doses, 2, to 4 times a day or in sustained release form. For most larger mammals (e.g., primates) the total daily dosage is from about 50 to about 1,500 milligrams. Dosage forms suitable for internal use comprise from about 10 to about 750 milligrams of active compound in intimate admixture with a solid or liquid pharmaceutically acceptable carrier or diluent.

A representative formulation suitable for oral administration is a capsule prepared by standard techniques which contains the following:

| Ingredients: | Parts by Weight: |
|---|---|
| 3-[2-(dimethylamino)ethyl]-3,4-dihydro-3-phenyl isocoumarin | 25 |
| Inert filler (starch, kaolin, lactose, etc.) | 275 |

EXAMPLE 1 o-{α-[2-(dimethylamino)ethyl]-α-hydroxy} phenethyl-N-methyl benzamide

To a flask equipped with a stirrer, dropping funnel, condenser and gas inlet tube maintained under a nitrogen atmosphere there is added at room temperature 40.0g (0.28 mole) of o-methyl-N-methyl benzamide and 250 ml. of anhydrous tetrahydrofuran. The reaction flask is immersed in an ice bath and cooled to an internal temperature of 5°C. Stirring is initiated and 380 ml. of 1.6 M. n-butyllithium (0.616 mole) in hexane is added dropwise in ca. 1 hour maintaining the temperature below 8°C. The resulting red dilithio salt is stirred at 5°C. for 1 additional hour and the reaction flask is then immersed in a dry-ice acetone bath and cooled to an internal temperature of −60°C. To the cold reaction mixture a solution of 49.7g (0.28 mole) 3-dimethylaminopropiophenone in 140 ml. anhydrous tetrahydrofuran is added dropwise in ca. 45 min. maintaining the temperature between −60° and −50°C. The resulting reaction mixture is stirred at −60°C. for 1 hour, allowed to warm to 0°C. in ca. 1 hour, and then treated with 200 ml. of saturated aqueous ammonium chloride while maintaining the temperature below 10°C. The resulting solid is filtered, washed thoroughly with water and recrystallized from methylene chloride-ether (1:1) to give o-{α-[2-(dimethylamino)ethyl]-α-hydroxy} phenethyl-N-methyl benzamide; m.p. 139.5–140.5°C.

When the above process is carried out and
a. o-methyl-N-allyl benzamide, or
b. o-methyl-N-benzyl benzamide is used in place of o-methyl-N-methyl benzamide, there is obtained
    a. o-{α-[2-(dimethylamino)ethyl]-α-hydroxy}-phenethyl-N-allyl benzamide, or
    b. o-{α-[2-(dimethylamino)ethyl]-α-hydroxy] phenethyl-N-benzyl benzamide, respectively.

When the above detailed process is carried out and in place of o-methyl-N-methyl benzamide there is used
c. 2-methyl-6-methoxy-N-methyl benzamide,
d. 4-chloro-2-methyl-N-methylbenzamide,
e. 2,3-dimethyl-N-methyl benzamide, or
f. 2-methyl-5-trifluoromethyl-N-methyl benzamide, there is obtained
    c. 2-{α-[2-(dimethylamino)ethyl]-α-hydroxy}phenethyl-6-methoxy-N-methyl benzamide,
    d. 4-chloro- -{α-[2-(dimethylamino)ethyl]-α-hydroxy}phenethyl-N-methyl benzamide,
    e. 2-{α-[2-dimethylamino)ethyl]-α-hydroxy}phenethyl-3,N-dimethyl benzamide, or
    f. 2-{α-[2-(dimethylamino)ethyl]-α-hydroxy}phenethyl-5-trifluoromethyl-N-methyl benzamide, respectively.

When the above detailed procedure is carried out and in place of 3-dimethylaminopropiophenone there is used
g. 3′, 4′-dichloro-3-dimethylaminopropiophenone,
h. 3-dimethylamino-4′-methoxypropiophenone,
i. 3-(N-methylpiperazino)propiophenone,
j. 3-morpholinopropiophenone,
k. 3-dimethylamino-2-methylpropiophenone,
l. 3-thiomorpholinopropiophenone,
m. 3-pyrrolidylpropiophenone,
n. 3-piperidinylpropiophenone,
o. 3-diallylamino-2′-methylpropiophenone,
p. 3-dibenzylamino-3′-trifluoromethylpropiophenone, or
q. 3-dimethylamino-3′,4′-methylenedioxypropiophenone, there is obtained
    g. o-{3,4-dichloro-α-[2-(dimethylamino)ethyl]-α-hydroxy}phenethyl-N-methyl benzamide,
    h. o-{α-[2-(dimethylamino)ethyl]-α-hydroxy-p-methoxy}phenethyl-N-methyl benzamide,
    i. o-{α-hydroxy-α-[(N-methylpiperazino)ethyl]}phenethyl-N-methyl benzamide,
    j. o-{α-hydroxy-α-[2-(morpholino)ethyl]} phenethyl-N-methyl benzamide,
    k. o-{α-[2-(dimethylamino-1-methyl)ethyl]-α-hydroxy}phenethyl-N-methyl benzamide,
    l. o-{α-hydroxy-α-[2-(thiomorpholino)ethyl]}phenethyl-N-methyl benzamide,
    m. o-{α-hydroxy-α-[2-(pyrrolidyl)ethyl]} phenethyl-N-methyl benzamide,
    n. {o- α-hydroxy-α[2-(piperidinyl)ethyl]} phenethyl-N-methyl benzamide,
    o. o-{α-[2-(diallylamino)ethyl]-α-hydroxy-o-methyl}phenethyl-N-methyl benzamide,
    p. o-{α-[2-(dibenzylamino)ethyl]-α-hydroxy-m-trifluoromethyl}phenethyl-N-methyl benzamide, or
    q. o-{α-[2-(dimethylamino)ethyl]-α-hydroxy-3,4-methylenedioxy }phenethyl-N-methyl benzamide, respectively.

EXAMPLE 2

3-[2-(dimethylamino)ethyl]-3,4-dihydro-3-phenyl isocoumarin

To a flask equipped with a stirrer, condenser and gas inlet tube maintained under a nitrogen atmosphere there is added at room temperature 16.3g (0.05 mole) of o-{α-[2-(dimethylamino)ethyl]-α-hydroxy}phenethyl-N-methyl benzamide and 170 ml. of o-dichloro benzene. Stirring is initiated and the mixture is heated at reflux for 18 hours. The excess o-dichlorobenzene is then removed by distillation in vacuo and the resulting oil is crystallized from ether to give 3-[2-(dimethylamino)ethyl]-3,4-dihydro-3-phenyl isocoumarin; m.p. 95.0°–95.5°C.

When the above process is carried out and in place of o-{α-[2-(dimethylamino)ethyl]-α-hydroxy}phenethyl-N-methyl benzamide there is used
a. o-{α-[2(dimethylamino)ethyl]-α-hydroxy-}}phenethyl-N-allyl benzamide,
b. o-{α-[2-(dimethylamino)ethyl]-α-hydroxy}phenethyl-N-benzyl benzamide, c. 2-{α-[2-(dimethylamino)ethyl]-α-hydroxy}phenethyl-6-methoxy-N-methyl benzamide,
d. 4-chloro-2-{α-[2-(dimethylamino)ethyl]-α-hydroxy}phenethyl-N-methyl benzamide,
e. 2-{α-[2-(dimethylamine)ethyl]-α-hydroxy}phenethyl-3,N-dimethyl benzamide,
f. 2-{α-[2-(dimethylamino)ethyl]-α-hydroxy}phenethyl-5-trifluoromethyl-N-methyl benzamide,
g. o-{3,4-dichloro-α-[2-(dimethylamino)ethyl]-α-hydroxy}phenethyl-N-methyl benzamide,
h. o-{α-[2-(dimethylamino)ethyl]-α-hydroxy-p-methoxy}phenethyl-N-methyl benzamide,
i. o-{α-hydroxy-α-[2-(N-methylpiperazino)ethyl]}phenethyl-N-methyl benzamide,
j. o-{α-hydroxy-α-[2-(morpholino)ethyl]}phenethyl-N-methyl benzamide,
k. o-{α-[2-(dimethylamino-1-methylethyl]-α-hydroxy}phenethyl-N-methyl benzamide,
l. o-{α-hydroxy-α-[2-(thiomorpholino)ethyl]}phenethyl-N-methyl benzamide,
m. o-{α-hydroxy-α-[2-(pyrrolidyl)ethyl]} phenethyl-N-methyl benzamide,
n. o-{α-hydroxy-α-[2-(piperidinyl)ethyl]}phenethyl-N-methyl benzamide,
o. o-{ α-[2-(diallylamino)ethyl-α-hydroxy-o-methyl}phenethyl-N-methyl benzamide,
p. o-{α-[2(dibenzylamino)ethyl]-α-hydroxy-m-trifluoromethyl}phenethyl-N-methyl benzamide, or
q. o-{α-[2-(dimethylamino)ethyl]-α-hydroxy-3,4-methylenedioxy}phenethyl-N-methyl benzamide, there is obtained a. 3-[2-(dimethylamino)ethyl]-3,4-dihydro-3-phenyl isocoumarin,
b. 3-[2-(dimethylamino)ethyl]-3,4-dihydro-3-phenyl isocoumarin,
c. 3-[2-(dimethylamino)ethyl]-3,4-dihydro-8-methoxy-3-phenyl isocoumarin,
d. 6-chloro-3-[2-(dimethylamino)ethyl]-3,4-dihydro-3-phenyl isocoumarin,
e. 3-[2-(dimethylamino)ethyl]-3,4-dihydro-5-methyl-3-phenyl isocoumarin,
f. 3-[2-(dimethylamino)ethyl]-3,4-dihydro-3-phenyl-7-trifluoromethyl isocoumarin,
g. 3-(3,4-dichlorophenyl)-3-[2-(dimethylamino)ethyl]-3,4-dihydro isocoumarin,
h. 3-[2-dimethylamino)ethyl]-3,4-dihydro-3-p-methoxyphenyl) isocoumarin,
i. 3,4-dihydro-3-[2-(N-methylpiperazino)ethyl]-3-phenyl isocoumarin,
j. 3,4-dihydro-3-[2-(morpholino)ethyl]-3-phenyl isocoumarin,
k. 3{[2-(dimethylamino)-1-methyl]ethyl}-3,4-dihydro-3-phenyl isocoumarin,
l. 3,4-dihydro-3-phenyl-3-[2-(thiomorpholino)ethyl]isocoumarin,
m. 3,4-dihydro-3-phenyl-3-[2-(pyrrolidyl)ethyl]isocoumarin,
n. 3,4-dihydro-3-phenyl-3-[2-(piperidinyl)ethyl]isocoumarin,
o. 3-[2-(diallylamino)ethyl]-3,4-dihydro-3-(o-methylphenyl)isocoumarin,
p. 3-[2-(dibenzylamino)ethyl]-3,4-dihydro-3-(m-trifluoromethylphenyl) isocoumarin, or
q. 3-[2-(dimethylamino)ethyl]-3,4-dihydro-3-(3,4-methylenedioxyphenyl) isocoumarin, respectively.

EXAMPLE 3

3-[2-(dimethylamino)ethyl]-3-phenyl isochroman hydrochloride

To a solution of 13.0g (0.042 mole) 3-[2-(dimethylamino)ethyl]-3,4-dihydro-3-phenyl isocoumarin in 220ml diglyme was added in one portion 177g (160ml) (0.126 mole) of boron trifluoride etherate. The resulting mixture was added dropwise with stirring to a solution of 3.2g sodium boronhydride (0.084 mole) in 220ml diglyme maintaining the temperature at 0°. After the addition was complete the resulting mixture was heated at 55° for 1 hour and then cooled in ice and treated dropwise with 100ml water, maintaining the temperature at about 5°C. The solvents were removed in vacuo and the residue treated with ether. The insoluble boronhydride adduct was dissolved in 320ml tetrahydrofuran containing 120ml glacial acetic acid and refluxed for 4 hours. The solvents were removed in vacuo and the residue dissolved in water and made basic by the addition of solid potassium hydride and extracted with ether. The ether was dried over anhydrous magnesium sulfate and filtered, cooled in ice and treated with gaseous hydrogen chloride and the resulting solid was filtered and recrystallized from methylene chloride-ether to give the product 3-[2-(dimethylamino) ethyl]-3-phenyl isochroman hydrochloride, m.p. 164.5°–165.0°.

When the above process is carried out and in place of 3-[2-(dimethylamino)ethyl]-3,4-dihydro-3-phenyl isocoumarin there is used a. 3-[2-(dimethylamino)ethyl]-3,4-dihydro-3-phenyl isocoumarin,
b. 3-[2-(dimethylamino)ethyl]-3,4-dihydro-3-phenyl isocoumarin,
c. 3-[2-(dimethylamino)ethyl]-3,4-dihydro-8-methoxy-3-phenyl isocoumarin,
d. 6-chloro-3-[2-(dimethylamino)ethyl]-3,4-dihydro-3-phenyl isocoumarin,
e. 3-[2-(dimethylamino)ethyl]-3,4-dihydro-5-methyl-3-phenyl isocoumarin,
f. 3-[2-(dimethylamino)ethyl]-3,4-dihydro-3-phenyl-7-trifluoromethyl isocoumarin,
g. 3-(3,4-dichlorophenyl)-3-[2-(dimethylamino)ethyl]-3,4-dihydro isocoumarin,
h. 3-[2-dimethylamino)ethyl]-3,4-dihydro-3-p-methoxyphenyl) isocoumarin,
i. 3,4-dihydro-3-[2-(N-methylpiperazino)ethyl]-3-phenyl isocoumarin,
j. 3,4-dihydro-3-[2-(morpholino)ethyl]-3-phenyl isocoumarin,
k. 3{[2-(dimethylamino)-1-methyl]ethyl}-3,4-dihydro-3-phenyl isocoumarin,
l. 3,4-dihydro-3-phenyl-3-[2-(thiomorpholino)ethyl]isocoumarin,
m. 3,4-dihydro-3-phenyl-3-[2-(pyrrolidyl)ethyl]isocoumarin,
n. 3,4-dihydro-3-phenyl-3-[2-(piperidinyl)ethyl]isocoumarin,
o. 3-[2-(diallylamino)ethyl]-3,4-dihydro-3-(o-methylphenyl)isocoumarin,
p. 3-[2-(dibenzylamino)ethyl]-3,4-dihydro-3-(m-trifluoromethylphenyl) isocoumarin, or
q. 3-[2-(dimethylamino)ethyl]-3,4-dihydro-3-(3,4-methylenedioxyphenyl) isocoumarin, respectively.
there is obtained as the hydrochloride a. 3-[2-(dimethylamino)ethyl]-3,4-dihydro-3-phenyl isochroman, b. 3-[2-(dimethylamino)ethyl]-3,4-dihydro-3-phenyl isochroman, c. 3-[2-(dimethylamino)ethyl]-3,4-dihydro-8-methoxy-3-phenyl isochroman, d. 6-chloro-3-[2-(dimethylamino)ethyl]-3,4-dihydro-3-phenyl isochroman, e. 3-[2-(dimethylamino)ethyl]-3,4-dihydro-5-methyl-3-phenyl isochroman, f. 3-[2-(dimethylamino)ethyl]-3,4-dihydro-3-phenyl-7-trifluoromethyl isochroman, g. 3-(3,4-dichlorophenyl)-3-[2-(dimethylamino)ethyl]-3,4-dihydro isochroman, h. 3-[2-dimethylamino)ethyl]-3,4-dihydro-3-p-methoxyphenyl) isochroman, i. 3,4-dihydro-3-[2-(N-methylpiperazino)ethyl]-3-phenyl isochroman, j. 3,4-dihydro-3-[2-(morpholino)ethyl]-3-phenyl isochroman, k. 3-{[2-(dimethylamino)-1-methyl]ethyl}-3,4-dihydro-3-phenyl isochroman, l. 3,4-dihydro-3-phenyl-3-[2-(thiomorpholino)ethyl]isochroman, m. 3,4-dihydro-3-phenyl-3-[2-(pyrrolidyl)ethyl]isochroman, n. 3,4-dihydro-3-phenyl-3-[2-(piperidinyl)ethyl]isochroman, o. 3-[2-(diallylamino)ethyl]-3,4-dihydro-3-(o-methylphenyl)isochroman, p. 3-[2-(dibenzylamino)ethyl]-3,4-dihydro-3-(m-trifluoromethylphenyl) isochroman, or q. 3-[2-(dimethylamino)ethyl]-3,4-dihydro-3-(3,4-methylenedioxyphenyl) isochroman, respectively.

What is claimed is:

1. 3-[2-(dimethylamino)ethyl]-3,4-dihydro-3-phenyl isocoumarin.

2. 3-(3,4-dichlorophenyl)-3[2-(dimethylamino)ethyl]-3,4-dihydro isocoumarin.

3. 3-[2-dimethylamino)ethyl]-3,4-dihydro-3-p-methoxyphenyl isocoumarin.

4. 3-[2-(dimethylamino)-1-methyl]ethyl -3,4-dihydro-3-phenyl isocoumarin.

5. 3-[2-(dimethylamino)ethyl]-3,4-dihydro-3-phenyl isochroman.

* * * * *